Patented Nov. 18, 1952

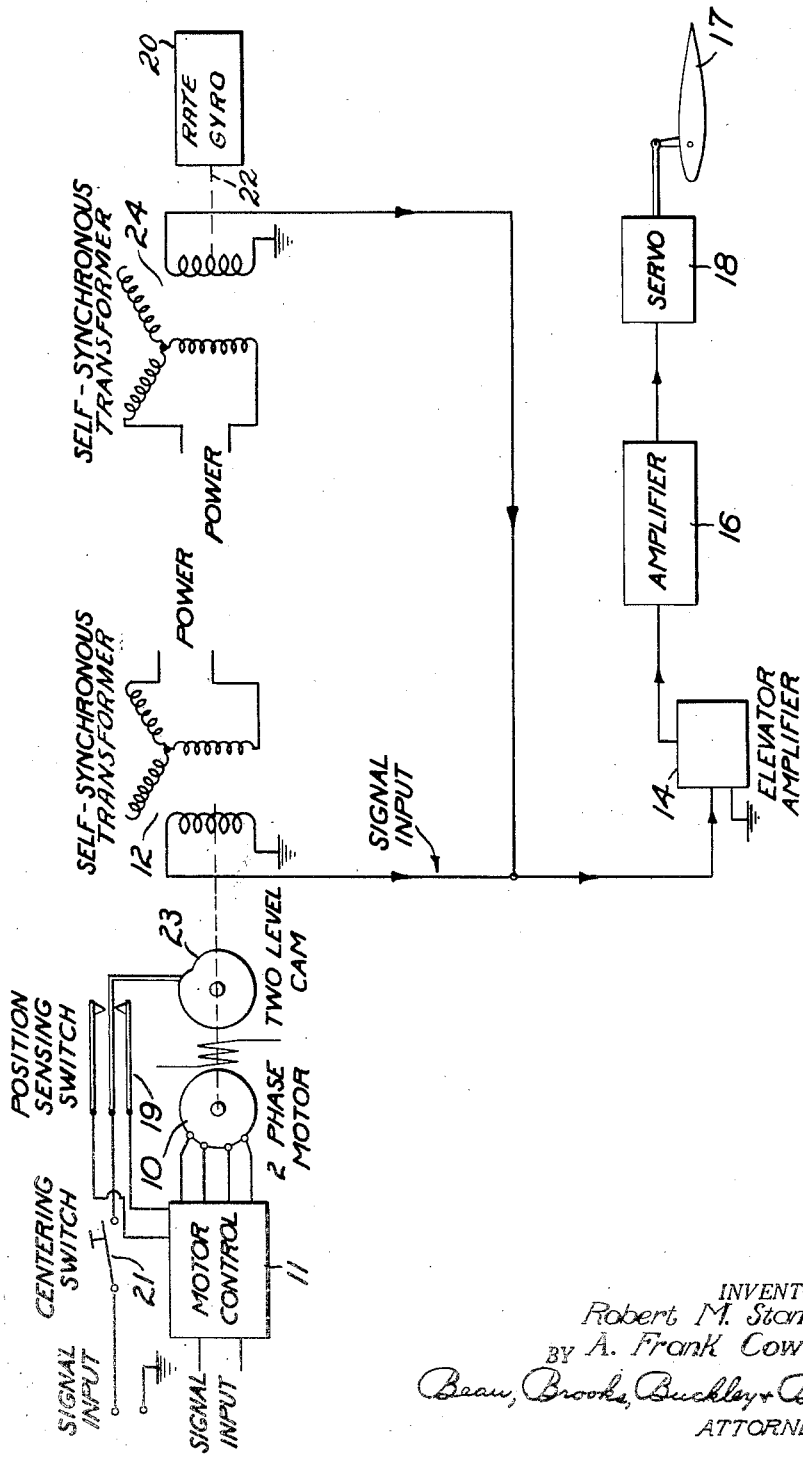

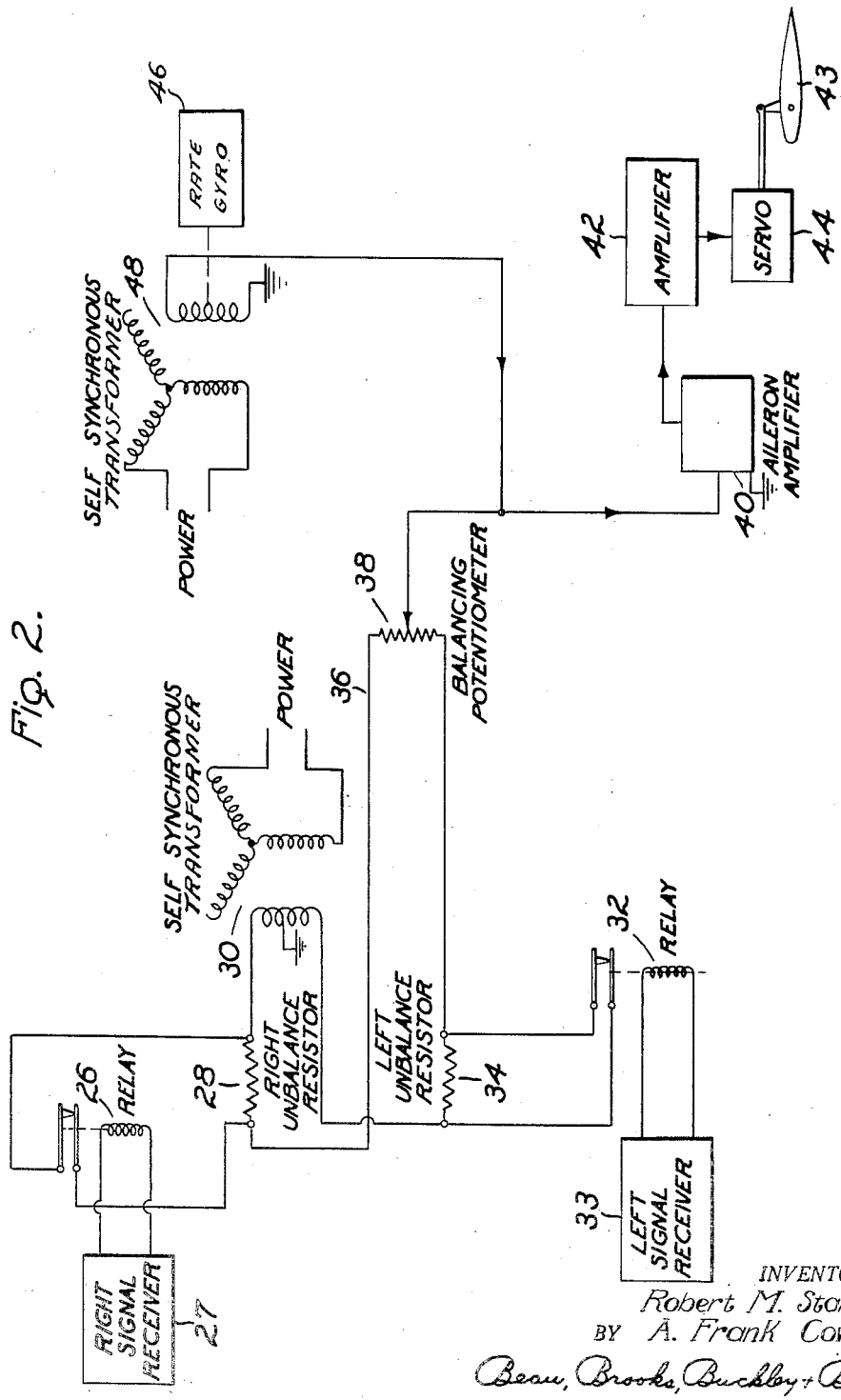

2,618,771

UNITED STATES PATENT OFFICE 2,618,771

REMOTE CONTROL EQUIPMENT FOR AIRCRAFT AND THE LIKE

Robert M. Stanley, Kenmore, and A. Frank Cowen, Jr., Buffalo, N. Y., assignors to Bell Aircraft Corporation, Wheatfield, N. Y.

Application April 24, 1946, Serial No. 664,570

2 Claims. (Cl. 318—489)

This invention relates to improvements in vehicle control, and more specifically to a new remote control means such as is particularly applicable to radio controlled pilotless aircraft and the like.

It is known that various displacement type automatic pilot arrangements have been previously devised for aircraft flight control purposes, but such prior art arrangements have been definitely limited in that they are unable to properly function whenever the gyro devices thereof attempt to exceed their mechanical limits of travel. Therefore it is a primary object of the present invention to provide an automatic control system which is free from such disadvantages and limitations of the prior art.

Another object of the invention is to provide a control system of the character described which comprises only simple and readily available components. Another object of the invention is to provide a control system wherein the vehicle control surface is at all times under the stabilizing control of a rate of displacement responsive device, such as for example a "rate gyro" which stabilizes the vehicle travel; in combination with a pilot control device adapted to modulate the stabilizing means. Other objects and advantages of the invention will appear in the specification hereinafter.

In the drawing:

Fig. 1 is a schematic showing of an application of the invention to the longitudinal pitch control of an airplane; and Fig. 2 is a schematic showing of an application of the invention to the roll control system of an airplane.

The drawings illustrate the invention by way of example in conjunction with the control of an airplane, but it will be understood that the invention may also be applied with equal facility to the control of any other vehicle. Also, it is to be understood that the invention is applicable either in conjunction with a radio control arrangement for remote radio control of an airplane or the like, or in conjunction with the control system of a piloted airplane.

For example, in Fig. 1 the control arrangement is illustrated to include a unit 10 comprising a two-phase motor which is adapted to receive through a motor control unit 11 a variable signal originating from a remote station and transmitted through a radio link, or a signal having originated from within the airplane at a pilot control station. The particular nature of the signal utilized forms no part of the present invention, since it may take various forms, such as a sinusoidal voltage whose amplitude or frequency varies in accordance with the control function. The armature of the motor 10 is coupled to the rotor of a self-synchronous transformer 12, and the synchronous transformer output is applied to the control grid of a vacuum tube amplifier 14. The output of the amplifier 14 is shown to be further amplified as at 16 and then applied to the control of the airplane elevator 17 by means of a servo device 18 for control of the airplane elevator. It will be understood that the amplifying means and the servo mechanism may be of any suitable types, and that the self-synchronous transformer may be of any suitable type and that in lieu of the Autosyn arrangement illustrated herein, any other suitable remote device may be employed such as a Selsyn unit or the like. Thus, it will be understood that as signals are received by the unit 10 they will be amplified and transmitted to the servo device 18 for actuation of the airplane flight control elevator to produce the desired maneuvering of the airplane.

The control arrangement also includes a rate-of-displacement responsive mechanism as indicated at 20; and the device 20 may be for example in the form of a so-called "rate gyro," or any other suitable device such as is sensitive to rate changes in a given plane. The gyro gimbal of the device 20 is coupled through a connecting link 22 to the rotor of a self-synchronous transformer 24 which may be of any suitable type such as are commercially known as the Autosyn or Selsyn types; the transformer output being in any case coupled to the control grid of the amplifier 14. The outputs of the transformers 12—24 are so regulated as to give the desired control characteristics. For example, the devices may be regulated so that during normal flight the rate-of-displacement responsive element of the control mechanism will function automatically to supply corrective control effects for maintaining the airplane in a given attitude, while at all times any pilot-imposed signals transmitted through the transformer 12 will overcome the stabilizing influences of the transformer 24 so that the aircraft may be controlled to perform any desired maneuver. Thus, subsequent to attainment of a desired attitude of flight, the airplane will be automatically stabilized against external disturbing influences such as wind gusts or the like by operation of the unit 24, while at all times the airplane may be freely controlled either from the ground or within the airplane through means of the pilot control motor mechanism 12.

The elevator control arrangement of the invention may be provided to incorporate a position sensing switch 19, the movable blade of which is arranged to be shifted upon operation of the rotor of the motor 10, as by a two-level cam 23 carried by the motor armature. Thus, when the switch 19 is placed in the motor power circuit as by actuation of a master switch 21, the motor will be driven to a center position thereby moving the cam to cause the switch blade 19 to be moved to its central or non-contacting position, thereby de-energizing the motor 10 so that it will be stopped at a predetermined position. The stopped position of the motor 10 may be regulated by manual adjustment of the cam relative to the motor shaft so that the motor will stop at any predetermined position for maintaining the airplane control surface at a predetermined angle relative to its streamlined position. Thus, provision is made whereby the pilot may operate suitable mechanism so as to close the switch 21, having preset the cam on the rotor shaft of the motor 10 at a predetermined position, whereupon the airplane elevator surface will assume a predetermined angle of deflection for changing the attitude of the aircraft until the motor is moved as described hereinabove.

Fig. 2 illustrates application of the invention to the roll control system of an airplane, and in this case the device is illustrated to include a relay 26 which when energized by a receiver 27 opens a shunt circuit thereby placing a resistor 28 in series with the circuit of a self-synchronous transformer 30, thereby electrically unbalancing the output of the transformer 30. The receiver 27 receives control signals from any external source for control of the ailerons. The relay 26 and the resistor 28 may be arranged to function for example in connection with the right aileron of the airplane, and a similar arrangement including a relay 32 energized by a receiver 33 and a resistor 34 is supplied for the left aileron control. As in the case of receiver 27, receiver 33 is supplied with control signals for the left aileron from any suitable external source. Thus, the bridge 36 will be electrically unbalanced upon operation of the relays 26—32; the phase of the bridge output being determined by which of the relays has been energized. The circuit 36 preferably includes a balancing potentiometer as at 38, whereby the airplane control system may be adjusted from time to time to trim the airplane. The output of the bridge 36 is carried to the grid of an amplifier 40, and as illustrated, the output of the amplifier 40 goes through an amplifier 42 and thence to control the aileron 43 by means of a servo mechanism 44. Thus, it will be understood that signals which may be supplied either by radio from a position remotely of the airplane, or directly from the pilot compartment, will be received either by the right aileron relay 26 or the left aileron relay 32 and will correspondingly unbalance the bridge 36 so as to power the servo 44 to bank the airplane as desired.

As in the case of Fig. 1, the control device of Fig. 2 also includes a rate-of-displacement responsive mechanism as indicated at 46, which may be in the form of a "rate gyro" or any other suitable device such as is sensitive to rate changes in a given plane. The gyro gimbal of the device 46 is coupled through a connecting link to the rotor of a self-synchronous transformer 48 which may be of any suitable type such as an Autosyn or Selsyn motor; the transformer output being in any case coupled to the grid of the amplifier 40. The outputs of the transformers 30—48 will of course be so regulated as to give the desired control characteristics so that during normal flight the rate-of-displacement responsive element of the control arrangement will function automatically to supply necessary corrective control effects to maintain the airplane in a given attitude, while pilot-imposed signals transmitted through the relays 26—32 will overcome the stabilizing influences of the transformer 48 so that the aircraft may be controlled to perform any desired maneuver.

Although only one specific airplane control application of the invention has been described and illustrated hereinabove, it will be apparent to those skilled in the art that the invention is not so limited but that various changes may be made therein without departing from the spirit of the invention or the scope of the appended claims.

What is claimed is:

1. In a vehicle control system, a control surface, servo-motor means for adjusting the position of said surface, a control signal input circuit, a motor control unit connected for control by said input circuit, a motor connected for operation from said control unit, a pair of adjustable-rotor servo-transformers, a rate-of-displacement gyro, means coupling the rotors of said transformers to the armature of said last-named motor and to the gimbal of said gyro respectively, an amplifier connected to energize said servo-motor to adjust the position of said surface in accordance with the electrical input to said amplifier, and conductors forming a parallel circuit from the outputs of said respective servo-transformers to the input of said amplifier, whereby the adjustment of said surface responds only to the output of that one of said servo-transformers whose output signal exceeds the output signal of the other.

2. A vehicle control system in accordance with claim 1, including a position-sensing switch connected to said motor control unit, a two-level cam on the shaft of the motor controlled by said control unit, and arranged to open said switch only at one position of said cam, and a centering circuit connected to said switch for driving said motor to the position in which said switch is open and thereby to adjust said surface to a predetermined position, said cam being adjustable angularly on said motor shaft to predetermine the position to which said surface is adjusted upon energization of said centering circuit.

ROBERT M. STANLEY.
A. FRANK COWEN, Jr.

REFERENCES CITED

The following references are of record in the file of this patent:

UNITED STATES PATENTS

| Number | Name | Date |
| --- | --- | --- |
| 1,436,280 | Minorsky | Nov. 21, 1922 |
| 1,703,280 | Minorsky | Feb. 26, 1929 |
| 1,958,258 | Alexanderson | May 8, 1934 |
| 2,361,790 | Noxon | Oct. 31, 1944 |
| 2,401,168 | Kronenberger | May 28, 1946 |
| 2,415,430 | Frische et al. | Feb. 11, 1947 |
| 2,415,819 | Halpert et al. | Feb. 18, 1947 |
| 2,419,970 | Roe et al. | May 6, 1947 |
| 2,429,642 | Newton | Oct. 28, 1947 |
| 2,464,629 | Young | Mar. 15, 1949 |